United States Patent [19]
Quiney

[11] 3,748,913
[45] July 31, 1973

[54] VEHICLE BRAKE ACTUATORS

[75] Inventor: Kenneth Maurice Quiney, Warwickshire, England

[73] Assignee: Girling Limited, Birmingham, England

[22] Filed: June 16, 1971

[21] Appl. No.: 153,670

[30] Foreign Application Priority Data
July 3, 1970    Great Britain ................... 32,322/70

[52] U.S. Cl. .............................................. 74/18.2
[51] Int. Cl. ............................................ F16j 15/56
[58] Field of Search ................... 74/18.2, 18; 92/168

[56] References Cited
UNITED STATES PATENTS
3,476,398    11/1969    Schanz ......................... 74/18.2 X
3,497,038    2/1970    Schrader et al ................. 73/18.2 X
3,502,004    3/1970    Schrader ......................... 74/18.2 X
3,528,301    9/1970    Wasmer ............................. 74/18.2

Primary Examiner—Charles J. Myhre
Assistant Examiner—F. D. Shoemaker
Attorney—Scrivener, Parker, Scrivener & Clark

[57] ABSTRACT

A dust excluding seal for an automotive brake actuator has an out-turned flange. Such a seal can be fitted to engage not the outside surface of the actuator housing but a surface preferably in a radial plane within the outside diameter of the housing. A lip surrounding the surface can have dove-tail recesses for a clip clamping the seal to the surface.

4 Claims, 3 Drawing Figures

VEHICLE BRAKE ACTUATORS

BACKGROUND OF THE INVENTION

The present invention concerns vehicle brake actuators, which are sometimes referred to as wheel cylinders, having each a dust excluding seal.

A seal used heretofore was generally cu-shaped with a hole in the base, the plunger being sealingly engaged in this hole, and with the side skirt engaged over the housing of the actuator or cylinder. There had to be a cut-away in the side for the connection between the housing and a mounting for the actuator. This cut-away impaired the sealing properties of the seal.

SUMMARY OF THE INVENTION

The present invention aims at providing a vehicle brake actuator having an improved dust excluding seal.

According to the present invention, a vehicle brake actuator comprises a housing having an axial piston bore and a recessed seating around that bore, the seating lying substantially in a plane perpendicular to the axis of the housing, a piston slidable in the bore, a seal which has an out-turned flange, and a means for retaining the seal in sealing contact with the housing the arrangement being such that the housing has a a peripheral lip surrounding the recessed seating and the means engages in this lip and pushes the flange axially against the seating.

A hydraulic vehicle brake actuator will now be described, by way of example with reference to the accompanying drawings.

THE DRAWINGS

DESCRIPTION OF A SPECIFIC EMBODIMENT

Figure 1:
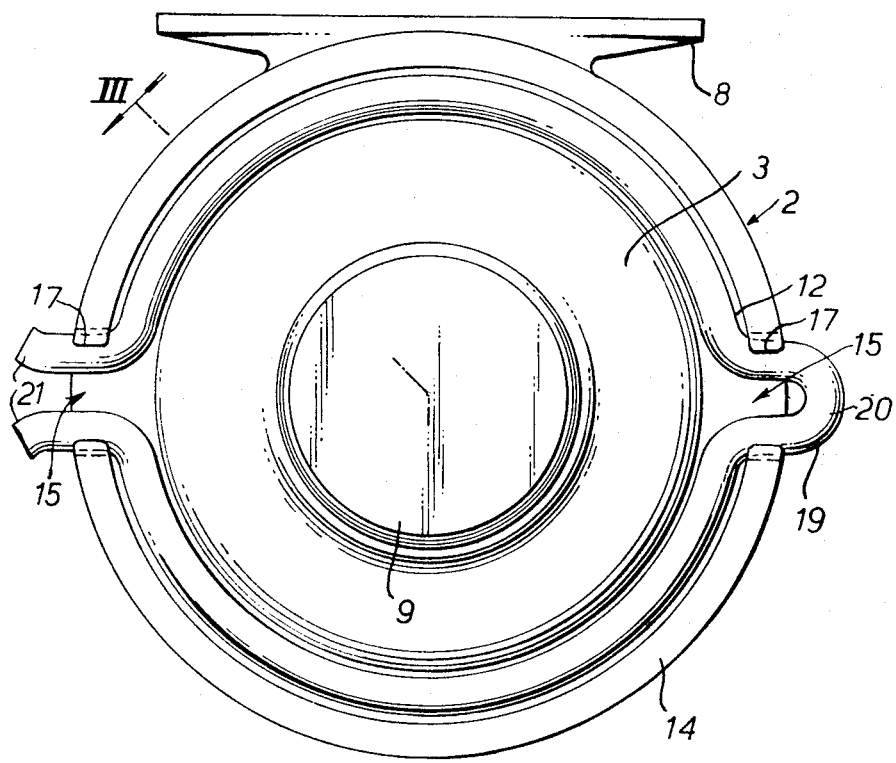
FIG. 1 is an end view on an actuator.
Figure 2:
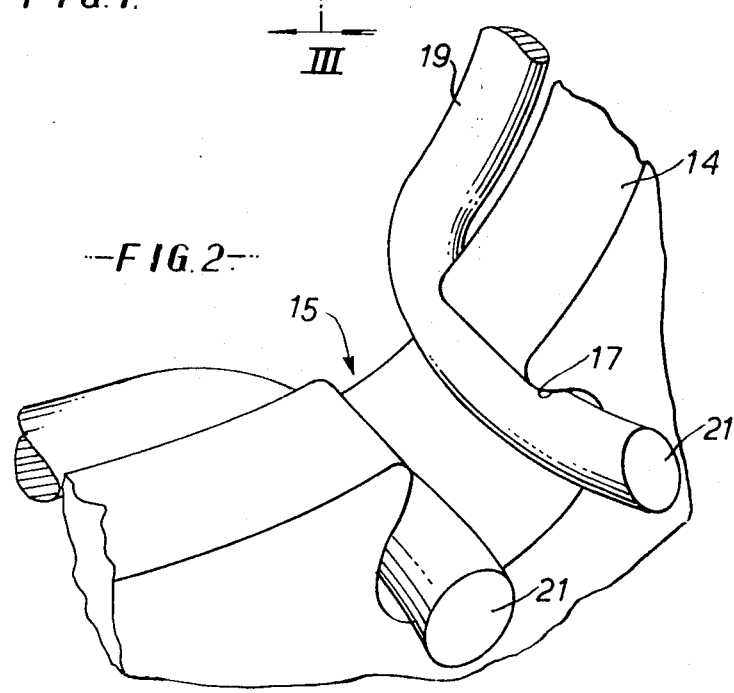
FIG. 2 is a detail perspective view showing arms of a clip engaged in a recess in the end of a housing of said actuator.
Figure 3:
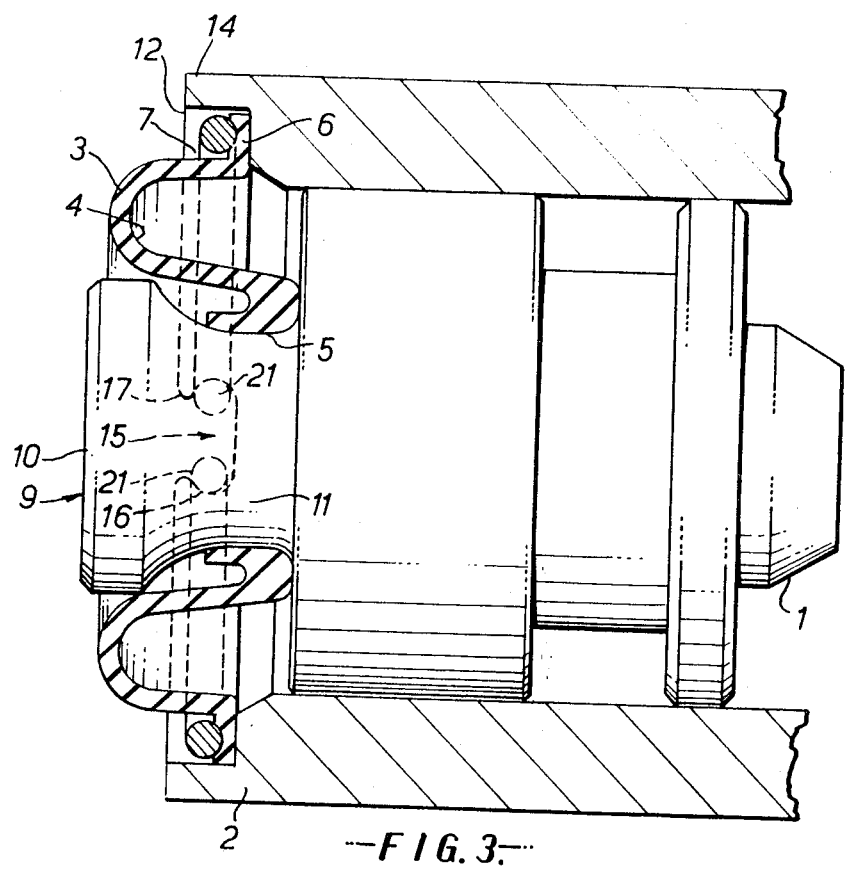
FIG. 3 is a cross-section on line III—III of FIG. 1 with part of the housing broken away.

As seen in the drawings, a vehicle brake actuator comprises a piston member 1 sliding in a cylinder member or housing 2 which is connected to a mounting 8. The mounting 8 can be slidable in a torque plate (not shown) of the brake.

To prevent damage to the ground outer surface of the piston member and the ground inner surface of the housing, there is a seal 3.

This seal is of a resilient material such as an elastomer which is preferably resistant to oil and grease as well as hydraulic fluid. In section the seal is of S-shape, that is, the seal is the annular body formed by an S revolved about an axis. It has a central aperture 5 and has an out-turned flange 6 forming part of its outside rim 7.

This seal embraces the piston member in a self-sealing manner on a capstan-shaped end fitting 9 thereof. The outer end 10 of this fitting is intended to abut a brake shoe and, for example, it has a groove (not shown) therein for this purpose. This end 10 is preferably chamfered to facilitate sliding the seal over this end onto a waisted portion 11 of the fitting 9.

The housing 2 has an annular recessed seating 12 concentric with its axial bore into which fits the flange 6. Preferably there is a small clearance between the outside edge of the flange 6 of the seal and the outer boundary of the seating so that as the seal engaged on the piston is slid into the seating it does not contact this boundary and will not scrape dirt thereon towards the axial bore.

The S is of sufficient length for the seal to act as a rolling seal without straining either the self-sealing seating of the seal on the fitting or the seal between the flange and the seating for the entire stroke of the piston. Alternatively the seal could be of a corrugated bellows form capable of an equivalent amount of extension.

A lip 14 remains around this seating at the end of the housing 2. This lip has dove-tail shaped recesses 15 formed in it, that is, it has recesses generally in the shape of peripheral slots 16 which are connected by smaller gaps defined by projections 17 to the end so that a spring clip 19 can be inserted through the gaps and allowed to open out in the slots. There are preferably two of these recesses diametrically opposite each other and at least one of them extends completely through the lip 14. The spring clip is a split ring of say spring steel with an outward projecting loop 20 engaging in one of these recesses (the recess for this loop does not have to extend completely through the lip nor is there any need for a gap as the loop can be slid into the respective slot 16 radially). Opposite this loop, the clip has two outwardly projecting fingers 21 which can be squeezed together whilst the clip is being fitted and the fingers inserted through the respective gap. The recesses can be designed with chamfered edges, as shown, to give a wedging action to urge the spring clip against the flange or can be disposed so that mere insertion of the clip gives a sealing force. The flange can be designed so that it is deformed outwardly by the clip against the outer boundary of the seating if desired. The spring clip can be slightly concave when seen looking at it sideways-on at right angles to the diameter through the loop and the fingers. This will even cut the pressure on the flange but in this case the loop and the cooperating recess should be at an angle to the plane of the clip to prevent the clip being fitted wrongly.

The seating lies in a generally radial plane, that is, it lies substantially in a plane perpendicular to the axis of the bore and of the housing but can be coned so that the flange is wedged either radially inwardly or radially outwardly. A washer can be interposed between the spring clip and the seal if desired.

A construction wherein the seating is formed by a machined or otherwise flat end of the housing is comprehended in the accompanying claims. In this construction, the housing would be provided with detents such as holes or pegs into which or onto which arms of a washer-like clip would engage. These detents in use would be equidistant from the backing plate of the brake and the clip would be slid along the piston to compress the seal and then the arms sprung into or onto the detents or the clip could engage the detents in bayonet-like manner.

I claim:

1. A vehicle brake actuator comprising a housing having an axial bore and a seating around said bore, said seating being substantially in a plane perpendicular to the axis of the housing, a piston slideable in the bore, a seal having an out turned flange engaging said seating, a spring clip for retaining said flange in sealing contact with said seating, said seating having lip means extending axially therefrom at the outer periphery thereof, at least two recesses in said lip means at least one of which opens out at the end of the housing, said spring clip including parts engaging with said recesses, the arrangement being such that the parts of said clip may be engaged in the recesses by squeezing said clip and inserting a part into a recess which opens out.

2. An actuator according to claim 1 wherein at least one of said at least two recesses is of dovetail shape and so arranged that chamfered edges urge the clip axially against the flange.

3. An actuator according to claim 2 wherein the clip is bowed in such a way as to even out the clamping pressure exerted in the axial direction on said flange.

4. An actuator according to claim 1 wherein said clip is a spring wire in the shape of a circle, at least one of said parts engageable with a recess being a loop in said wire extending radially outside of said circle and another of said parts being the ends of said wire bent radially outwardly of said circle and which are squeezeable together for engagement with at least one recess which opens out.

* * * * *